US 12,400,303 B2

(12) United States Patent
Frey et al.

(10) Patent No.: US 12,400,303 B2
(45) Date of Patent: Aug. 26, 2025

(54) IMAGE REPLACEMENT INPAINTING

(71) Applicant: GOOGLE LLC, Mountain View, CA (US)

(72) Inventors: Nathan James Frey, Los Angeles, CA (US); Vinay Kotikalapudi Sriram, Boyds, MD (US)

(73) Assignee: Google LLC, Mountain View, CA (US)

( * ) Notice: Subject to any disclaimer, the term of this patent is extended or adjusted under 35 U.S.C. 154(b) by 841 days.

(21) Appl. No.: 17/641,700

(22) PCT Filed: May 13, 2020

(86) PCT No.: PCT/US2020/032677
§ 371 (c)(1),
(2) Date: Mar. 9, 2022

(87) PCT Pub. No.: WO2021/230863
PCT Pub. Date: Nov. 18, 2021

(65) Prior Publication Data
US 2022/0301118 A1 Sep. 22, 2022

(51) Int. Cl.
G06T 5/77 (2024.01)
G06T 5/50 (2006.01)

(52) U.S. Cl.
CPC ............... G06T 5/77 (2024.01); G06T 5/50 (2013.01); G06T 2207/10016 (2013.01); G06T 2207/20081 (2013.01); G06T 2207/20084 (2013.01)

(58) Field of Classification Search
CPC ... G06T 5/77; G06T 5/50; G06T 2207/10016; G06T 2207/20081; G06T 2207/20084
See application file for complete search history.

(56) References Cited

U.S. PATENT DOCUMENTS 9,519,984 B2 12/2016 Masuko
10,503,998 B2 12/2019 Harron et al.
(Continued)

FOREIGN PATENT DOCUMENTS

CN 108830827 11/2018
CN 109472260 3/2019
(Continued)

OTHER PUBLICATIONS

Dahun Kim [online], "Deep Video Inpainting—VINet (CVPR 2019)" Presented at the IEEE Conference on Computer Vision and Pattern Recognition, Jun. 21, 2019, retrieved on Oct. 11, 2022, <https://www.youtube.com/watch?v=RtThGNTvkjY>, 3 pages (Video Submission).
(Continued)

Primary Examiner — Lewis G West
(74) Attorney, Agent, or Firm — Fish & Richardson P.C.

(57) ABSTRACT

A method for replacing an object in an image. The method may include identifying a first object at a position within a first image, masking, based on the first image and the position of the first object, a target area to produce a masked image, generating, based on the masked image and an inpainting machine learning model, a second image different from the first image, the inpainting machine learning model being trained using a difference between the target area of training images and content of generated images at location corresponding to the target area of the training images, generating, based on the masked image and the second image, a third image, and adding, to the third image, a new object different from the first object.

17 Claims, 5 Drawing Sheets

(56) References Cited

U.S. PATENT DOCUMENTS

| | | | | |
|---|---|---|---|---|
| 10,540,757 | B1* | 1/2020 | Bouhnik | G06T 3/14 |
| 10,755,391 | B2* | 8/2020 | Lin | G06T 5/77 |
| 11,776,184 | B2* | 10/2023 | Zhang | G06F 3/04845 |
| | | | | 382/100 |
| 11,854,203 | B1* | 12/2023 | Gafni | G06T 7/70 |
| 12,223,672 | B2* | 2/2025 | Assouline | G06T 13/40 |
| 2013/0094780 | A1 | 4/2013 | Tang | G06T 11/60 |
| | | | | 382/284 |
| 2019/0200050 | A1 | 6/2019 | Zhang et al. | |
| 2019/0236759 | A1 | 8/2019 | Lai et al. | |
| 2019/0311505 | A1* | 10/2019 | Helm | A61B 6/5282 |
| 2019/0355102 | A1* | 11/2019 | Lin | G06T 5/77 |
| 2020/0327675 | A1* | 10/2020 | Lin | G06T 5/77 |
| 2021/0073961 | A1* | 3/2021 | Safdarnejad | G06T 11/60 |
| 2021/0133936 | A1* | 5/2021 | Chandra | G06T 5/50 |
| 2021/0334935 | A1* | 10/2021 | Grigoriev | G06N 3/08 |
| 2021/0342983 | A1* | 11/2021 | Lin | G06N 3/088 |
| 2021/0342984 | A1* | 11/2021 | Lin | G06T 5/50 |
| 2022/0366544 | A1* | 11/2022 | Kudelski | G06T 5/60 |

FOREIGN PATENT DOCUMENTS

| | | |
|---|---|---|
| CN | 109564575 | 4/2019 |
| EP | 2492843 | 8/2012 |
| JP | 2003-333424 | 11/2003 |
| KR | 10-2013-0140904 | 12/2013 |
| KR | 10-2019-0021967 | 3/2019 |

OTHER PUBLICATIONS

International Search Report and Written Opinion in International Appln. No. PCT/US2020/032677, dated Feb. 4, 2021, 14 pages.

Isola et al., "Image-to-image translation with conditional adversarial networks." Proceedings of the IEEE conference on computer vision and pattern recognition. 2017, 1125-1134.

Jin et al., "Video logo removal detection based on sparse representation." Multimedia Tools and Applications 77.22, Nov. 2018, 29303-29322.

Mosleh et al., "Automatic inpainting scheme for video text detection and removal." IEEE Transactions on Image processing 22.11 Jul. 17, 2013, 4460-4472.

Wang et al., "Automatic TV logo detection, tracking and removal in broadcast video." International Conference on Multimedia Modeling. Springer, Berlin, Heidelberg, Jan. 9, 2007, 63-72.

Office Action in Chinese Appln. No. 202080070503.X, mailed on Aug. 7, 2024, 17 pages (with English translation).

International Preliminary Report on Patentability in International Appln. No. PCT/US2020/032677, mailed on Nov. 24, 2022, 7 pages.

Notice of Allowance in Korean Appln. No. 10-2022-7011445, mailed on Nov. 16, 2023, 3 pages (with English translation).

Notice of Allowance in Japanese Appln. No. 2022-521020, mailed on Feb. 19, 2024, 5 pages (with English translation).

Office Action in India Appln. No. 202227012575, mailed on Jun. 10, 2024, 3 pages (with English translation).

Office Action in India Appln. No. 202227012575, mailed on Jun. 25, 2024, 3 pages (with English translation).

Office Action in Japanese Appln. No. 2022-521020, mailed on Sep. 11, 2023, 7 pages (with English translation).

Office Action in Chinese Appln. No. 202080070503.X, mailed on Nov. 19, 2024, 14 pages (with English translation).

Din et al., "A novel GAN-based network for unmasking of masked face." IEEE Access 8, Mar. 2020, 44276-44287.

Office Action in Japanese Appln. No. 2022-521020, dated Mar. 27, 2023, 9 pages (with English translation).

Office Action in Korean Appln. No. 10-2022-7011445, dated May 9, 2023, 11 pages (with English translation).

Office Action in India Appln. No. 202227012575, dated Jan. 5, 2023, 6 pages (with English translation).

Office Action in Chinese Appln. No. 202080070503.X, mailed on Mar. 28, 2025, 17 pages (with English translation).

Office Action in European Appln. No. 20729539.5, mailed on Jan. 2, 2025, 6 pages.

* cited by examiner

IMAGE REPLACEMENT INPAINTING

CROSS-REFERENCE TO RELATED APPLICATIONS

This application is a National Stage Application under 35 U.S.C. § 371 and claims the benefit of International Application No. PCT/US2020/032677, filed May 13, 2020. The disclosure of the foregoing application is incorporated herein by reference in its entirety.

BACKGROUND

This document relates to a method for replacing portions of an image using inpainting.

SUMMARY

In general, one innovative aspect of the subject matter described in this specification may be embodied in a computer-implemented method for replacing an object in an image. The method may include identifying a first object at a position within a first image, masking, based on the first image and the position of the first object, a target area to produce a masked image, generating, based on the masked image and an inpainting machine learning model, a second image different from the first image, the inpainting machine learning model being trained using a difference between the target area of training images and content of generated images at a location corresponding to the target area of the training images, generating, based on the masked image and the second image, a third image, and adding, to the third image, a new object different from the first object.

These and other embodiments may each optionally include one or more of the following features.

In some implementations, the inpainting machine learning model is trained using a loss function that represents a difference between the target area of training images and content of generated images at a location corresponding to the target area of the training images.

In some implementations, the first image is a frame of a video.

In some implementations, generating, based on the masked image and the second image, a third image includes masking, based on the second image and the location corresponding to the target area of the first image, an inverse target area to produce an inverse masked image, and generating, based on the masked image and the inverse masked image, the third image. The inverse target area can include an area of the second image that is outside of the location corresponding to the target area of the first image. Masking, based on the second image and the location corresponding to the target area of the first image, an inverse target area to produce an inverse masked image can include generating, from the second image, an inverse masked image that includes at least some content of the second image that is inside the target area and that does not include at least some content of the second image that is outside the target area. Generating the third image can include compositing the inverse masked image with the masked image.

In some implementations, the method includes extrapolating, based on the third image, a fourth image, wherein each of the first image, second image, third image, and fourth image is a frame of a video.

Other embodiments of this aspect include corresponding systems, apparatus, and computer programs, configured to perform the actions of the methods, encoded on computer storage devices.

Particular embodiments of the subject matter described in this document can be implemented so as to realize one or more of the following advantages. In certain environments, there has previously been no way to replace portions of images in files such as final renderings of video or images without creating areas surrounding the portions to be replaced that are visually inconsistent with the original video or image. For example, closed captions in a final rendering of a video could not simply be altered or replaced to provide translations, corrections, or updates, as previous methods would generally replace the areas surrounding the original closed captions with a solid shape of a single color or attempting to remove the original closed captions using inpainting techniques and rendering the translated captions over the box or the removed captions. These previous methods are jarring and/or inaccurate, and can negatively affect a user's experience when viewing the video or image and, by extension, the user's reaction to the content of the video or image. In general, existing solutions for inpainting are trained using entire images and may not effectively reconstruct smaller areas of an image due to variations in structure and detail across the image, and that shortcoming is addressed by the techniques, devices, and systems discussed herein. The techniques described in this document enable a system to provide an improved solution to image replacement by masking an area to be replaced, using an inpainting machine learning model (also referred to as an inpainting model) trained using areas surrounding particular types of objects within an image, to inpaint (e.g., predictively create or reconstruct) a proper subset of the image (e.g., corresponding to the masked area) that is smaller than the image, and rendering the replacement image over the inpainted area.

This new system supports the replacement of portions of images in finally rendered videos or images having both natural and synthetic backgrounds. Because current inpainting model training techniques train a model using images that vary greatly in visual characteristics, existing inpainting methods produce inaccurate results when applied to images having areas that vary in structure, color, and texture, among other visual characteristics. This new image replacement method uses a deep learning model that is trained on reconstructing limited areas of images surrounding particular types of objects. For example, this new system can use an inpainting model trained to reconstruct areas surrounding simple, solid shapes when the target content is a simple solid shape, and an inpainting model trained to reconstruct areas surrounding text when the target content is text. Because the inpainting models are trained to focus on limited areas surrounding a target object (e.g., within a masked area), the models can more accurately reconstruct the details and variations within the area. More specifically, the loss function for the inpainting model can focus on the portion of the newly generated image corresponding to the masked area, rather than allowing the area outside the masked area to dominate the loss function, as the content outside the masked area should be readily reproducible leading to very low differences between those portions of the original image and the newly generated image. Furthermore, the inpainting models can be trained for particular types of objects such that inpainting models can be trained for reconstruction surrounding and within a complex object with multiple areas of transparency; text of a particular style and spacing; a particular image representing a logo; among other specific applications.

The system provides an efficient solution that allows for videos and images to be altered and/or customized based on an original image after the image has been finally rendered. The system improves the accuracy with which a target area can be masked and removed from an image using an inpainting method by implementing a novel solution that trains inpainting models using tailored portions of test data to improve the accuracy with which the system reconstructs areas having various visual characteristics. Additionally, the system allows for dynamic updating of content based on particular characteristics, including user preferences. For example, if a user is watching a video that includes English language audio and closed captioning in Spanish, and the user's preferred language is Chinese, the system allows the video to be altered and re-rendered such that the video includes closed captioning in Chinese. In some implementations, the system can automatically detect the alterations or customizations needed. For example, the system can determine, based on user information indicating that the user's preferred language is Chinese, to replace the closed captioning in English with generated closed captioning in Chinese. In some implementations, the system is provided with the alterations or customizations to be made. For example, the system can receive a set of closed captioning in Chinese and an indication that the object to be replaced is the set of closed captioning in Spanish. Furthermore, non-text content can also be replaced, as desired. For example, the video can be modified to replace items that are deemed inappropriate for the current audience, or that violate terms of service for distributing videos (e.g., excessively graphic content). In some implementations, the system allows content to be moved relative to its frame. For example, a logo in a top layer that is obscuring content in the background can be relocated so that the content in the background is visible.

Leveraging this method allows images and videos to be customized for a particular application, user preferences, and geographical locations, among other factors. In addition, the improved removal and re-rendering process provides efficiencies in video and image content production by reducing the overall amount of resources consumed by allowing a single video project to be adapted and used for different applications and users. This allows reduced bandwidth of transmission of video across networks as only one video project need be transferred to a node, and reduced processing resource required to render more than one video project as the aspects of a video project being modified by the system are significantly less than a whole new video project being rendered (and then transferred to a node). This system provides an avenue for video designers, developers, and content providers to tailor image and video content after the design, editing, and post-processing phases, which require heavy expenditure of resources.

Additionally, the benefits of this method include allowing video creators to alter only a portion of a video project. The method allows video projects to be customized for a particular application, user preferences, and geographical locations, among other factors. In addition to reducing the amount of resources required to customize and render a video for each request, the system reduces the overall amount of resources consumed by allowing a single video project to be adapted and used for different applications and users.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
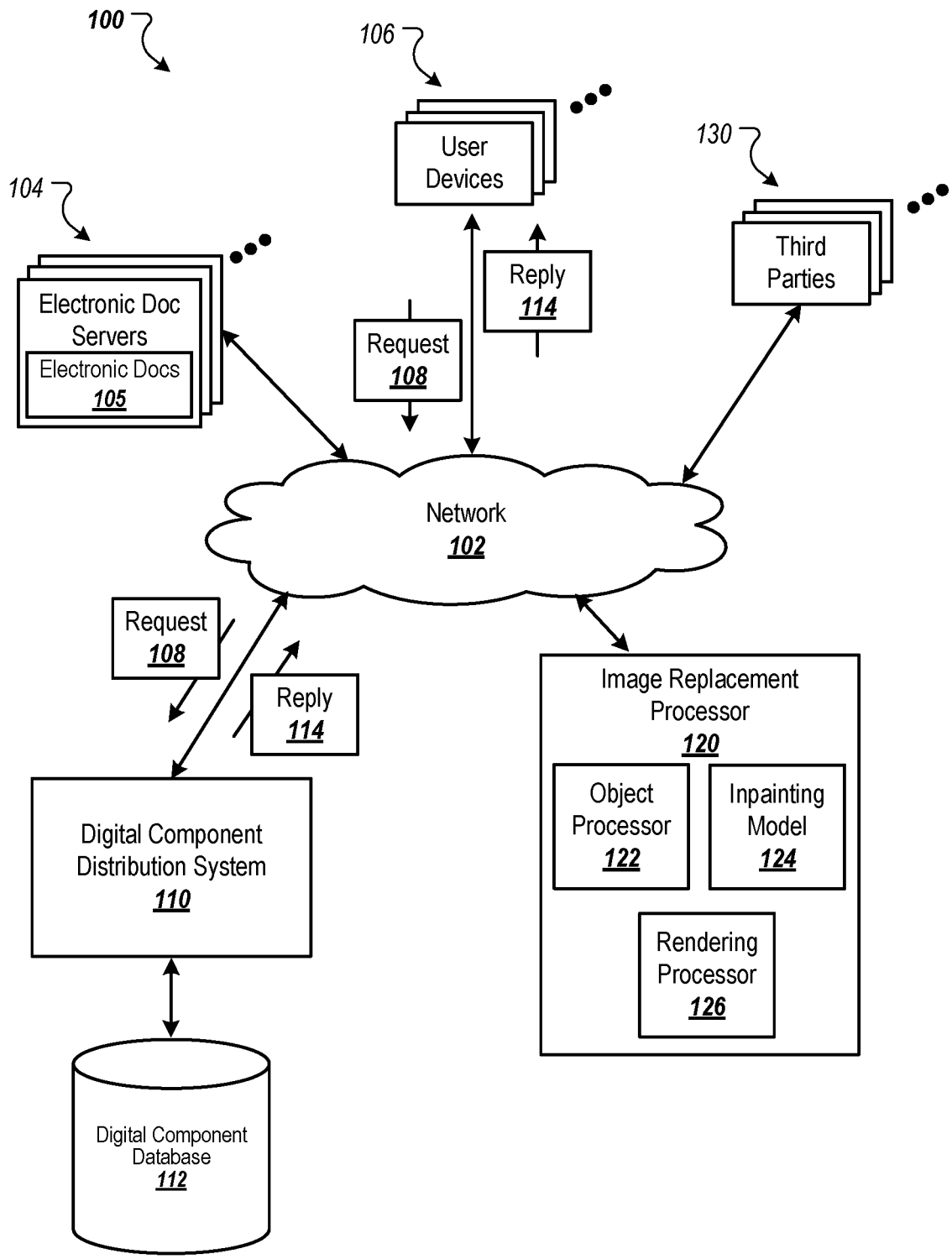
FIG. 1 is a block diagram of an example environment for improved image replacement inpainting.

This document describes methods, systems, and devices that improve content replacement in images and videos, enabling a single image or video to be used for multiple applications, modified to comply with local norms and standards, comply with terms of service for image/video distribution, and to be tailored to different users' preferences.

In some implementations, the system allows a finally rendered image or video to be altered at the time of request and customized based on the context in which the image or video will be presented, e.g., geographic area to which the image will be distributed and/or audience information. In some situations, the techniques discussed herein can be used by a video creator who wishes to adapt a video project for a particular client.

For example, the system can receive a finally rendered video from a content provider. The video includes an image that is to be adapted based on a viewer's location. In this example, the video is a public service announcement to be used across the United States, and the image can be a logo displayed in a corner of each frame of the video. The logo can be adapted to be the state in which a viewer is located. The system can detect the logo as a target, the target's position within the frame, that the target is a solid shape, and determine a bounding box that surrounds the target. The bounding box can be determined based on parameters including a target accuracy granularity and a target image quality, among other parameters. For each frame, the system can then generate a mask for the portion of the frame within the bounding box that removes the logo and an "inverse" mask for the portion of the frame outside of the bounding box. The mask for the portion of the frame within the bounding box is applied to the frame to create a masked image with the content inside of the bounding box removed. The masked image is provided to an inpainting model trained to focus on areas surrounding the bounding box. The inpainting model is used to generate a second, different frame that includes the content inside of the bounding box as well as the content outside of the bounding box. Thus, the inpainting model used to generate the content is adapted for this particular application. The inverse mask for the portion of the frame outside of the bounding box is applied to the second, different frame to create an inverse masked image with the content outside of the bounding box removed. The system can then render a new frame by compositing the masked image and the inverse masked image. In other words, the portion of the original image that is outside of the bounding box can be combined with the portion of the generated image that is inside the bounding box to create a new image that does not include the target. A replacement object is identified and can be placed in the new frame in the same position in which the target was located in the original frame. In some implementations, the replacement object is placed in the new frame in a different position relative to the position in which the target was located in the original frame. The system can render the new frame with the replacement object and render the entire video with new frames to produce a final video to be presented in response to the request.

FIG. 1 is a block diagram of an example environment 100 for improved image replacement inpainting. The example environment 100 includes a network 102, such as a local area network (LAN), a wide area network (WAN), the Internet, or a combination thereof. The network 102 connects electronic document servers 104 ("Electronic Doc Servers"), user devices 106, and a digital component distribution system 110 (also referred to as DCDS 110). The example environment 100 may include many different electronic document servers 104 and user devices 106.

A user device 106 is an electronic device that is capable of requesting and receiving resources (e.g., electronic documents) over the network 102. Example user devices 106 include personal computers, mobile communication devices, and other devices that can send and receive data over the network 102. A user device 106 typically includes a user application, such as a web browser, to facilitate the sending and receiving of data over the network 102, but native applications executed by the user device 106 can also facilitate the sending and receiving of data over the network 102.

One or more third parties 150 include content providers, product designers, product manufacturers, and other parties involved in the design, development, marketing, or distribution of videos, products, and/or services.

An electronic document is data that presents a set of content at a user device 106. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents 105 ("Electronic Docs") can be provided to user devices 106 by electronic document servers 104. For example, the electronic document servers 104 can include servers that host publisher websites. In this example, the user device 106 can initiate a request for a given publisher webpage, and the electronic document server 104 that hosts the given publisher webpage can respond to the request by sending machine Hyper-Text Markup Language (HTML) code that initiates presentation of the given webpage at the user device 106.

Electronic documents can include a variety of content. For example, an electronic document 105 can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include a tag or script that causes the user device 106 to request content from the data source when the given electronic document is processed (e.g., rendered or executed) by a user device 106. The user device 106 integrates the content obtained from the data source into a presentation of the given electronic document to create a composite electronic document including the content obtained from the data source.

In some situations, a given electronic document can include a digital content tag or digital content script that references the DCDS 110. In these situations, the digital content tag or digital content script is executed by the user device 106 when the given electronic document is processed by the user device 106. Execution of the digital content tag or digital content script configures the user device 106 to generate a request 108 for digital content, which is transmitted over the network 102 to the DCDS 110. For example, the digital content tag or digital content script can enable the user device 106 to generate packetized data request including a header and payload data. The request 108 can include data such as a name (or network location) of a server from which the digital content is being requested, a name (or network location) of the requesting device (e.g., the user device 106), and/or information that the DCDS 110 can use to select digital content provided in response to the request. The request 108 is transmitted, by the user device 106, over the network 102 (e.g., a telecommunications network) to a server of the DCDS 110.

The request 108 can include data specifying the electronic document and characteristics of locations at which digital content can be presented. For example, data specifying a reference (e.g., URL) to an electronic document (e.g., webpage) in which the digital content will be presented, available locations (e.g., digital content slots) of the electronic documents that are available to present digital content, sizes of the available locations, positions of the available locations within a presentation of the electronic document, and/or media types that are eligible for presentation in the locations can be provided to the DCDS 110. Similarly, data specifying keywords designated for the selection of the electronic document ("document keywords") or entities (e.g., people, places, or things) that are referenced by the electronic document can also be included in the request 108 (e.g., as payload data) and provided to the DCDS 110 to facilitate identification of digital content items that are eligible for presentation with the electronic document.

Requests 108 can also include data related to other information, such as information that the user has provided, geographic information indicating a state or region from which the request was submitted, or other information that provides context for the environment in which the digital content will be displayed (e.g., a type of device at which the digital content will be displayed, such as a mobile device or tablet device). User-provided information can include demographic data for a user of the user device 106. For example, demographic information can include age, gender, geographical location, education level, marital status, household income, occupation, hobbies, social media data, and whether the user owns a particular item, among other characteristics.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Data specifying characteristics of the user device 106 can also be provided in the request 108, such as information that identifies a model of the user device 106, a configuration of the user device 106, or a size (e.g., physical size or resolution) of an electronic display (e.g., touchscreen or desktop monitor) on which the electronic document is presented. Requests 108 can be transmitted, for example, over a packetized network, and the requests 108 themselves can be formatted as packetized data having a header and payload data. The header can specify a destination of the packet and the payload data can include any of the information discussed above.

The DCDS 110 selects digital content that will be presented with the given electronic document in response to receiving the request 108 and/or using information included in the request 108. In some implementations, the DCDS 110 is implemented in a distributed computing system (or environment) that includes, for example, a server and a set of multiple computing devices that are interconnected and identify and distribute digital content in response to requests 108. The set of multiple computing devices operate together to identify a set of digital content that is eligible to be presented in the electronic document from among a corpus of millions or more of available digital content. The millions or more of available digital content can be indexed, for example, in a digital component database 112. Each digital content index entry can reference the corresponding digital content and/or include distribution parameters (e.g., selection criteria) that condition the distribution of the corresponding digital content.

In some implementations, digital components from digital component database 112 can include content provided by third parties 150. For example, digital component database 112 can receive, from a third party 150 that uses machine learning and/or artificial intelligence to navigate public streets, a photo of a public intersection. In another example, digital component database 112 can receive, from a third party 150 that provides services to bicycle riders, specific questions to which third party 150 would like responses from users. Additionally, the DCDS 110 can present video content, including content from, for example, video rendering processor 130 and video content provided by video rendering processor 130 stored in the digital component database 112.

The identification of the eligible digital content can be segmented into multiple tasks that are then assigned among computing devices within the set of multiple computing devices. For example, different computing devices can each analyze a different portion of the digital component database 112 to identify various digital content having distribution parameters that match information included in the request 108.

The DCDS 110 aggregates the results received from the set of multiple computing devices and uses information associated with the aggregated results to select one or more instances of digital content that will be provided in response to the request 108. In turn, the DCDS 110 can generate and transmit, over the network 102, reply data 114 (e.g., digital data representing a reply) that enables the user device 106 to integrate the select set of digital content into the given electronic document, such that the selected set of digital content and the content of the electronic document are presented together at a display of the user device 106.

Image replacement processor 120 receives, or retrieves, images and videos and replaces particular portions of an image or video. Image replacement processor 120 includes an object processor 122, an inpainting model 124, and a rendering processor 126. Object processor 122 processes an image or video to detect objects and generate bounding boxes surrounding the detected objects. Inpainting model 124 uses machine learning techniques to recreate particular portions of an image or video within, for example, the bounding boxes generated by object processor 122. Rendering processor 126 renders altered images and or videos.

For ease of explanation, object processor 122, inpainting model 124, and rendering processor 126 are shown in FIG. 1 as separate components of image replacement processor 120. Image replacement processor 120 can be implemented as a single system on non-transitory computer-readable media. In some implementations, one or more of object processor 122, inpainting model 124, and rendering processor 126 can be implemented as integrated components of a single system. Image replacement processor 120, its components object processor 122, inpainting model 124, and rendering processor, and their respective operations and outputs are described in further detail below.

Inpainting model 124 can be a statistical and/or machine learning model. For example, inpainting model 124 can be a generative-adversarial-network (GAN) model that is trained using a loss function that focuses on a limited area of an image (e.g., within a masked area or within some specified distance of the masked area). In some implementations, inpainting model 124 can include, in addition to the GAN model, any of a variety of models such as decision trees, linear regression models, logistic regression models, neural networks, classifiers, support vector machines, inductive logic programming, ensembles of models (e.g., using techniques such as bagging, boosting, random forests, etc.), genetic algorithms, Bayesian networks, etc., and can be trained using a variety of approaches, such as deep learning, association rules, inductive logic, clustering, maximum entropy classification, learning classification, etc. In some examples, the machine learning models may use supervised learning. In some examples, the machine learning models use unsupervised learning. The training of inpainting model 124 is described in detail below with respect to FIG. 3.

The techniques described below enable a system to efficiently edit and render video, regardless of complexity.

Figure 2:
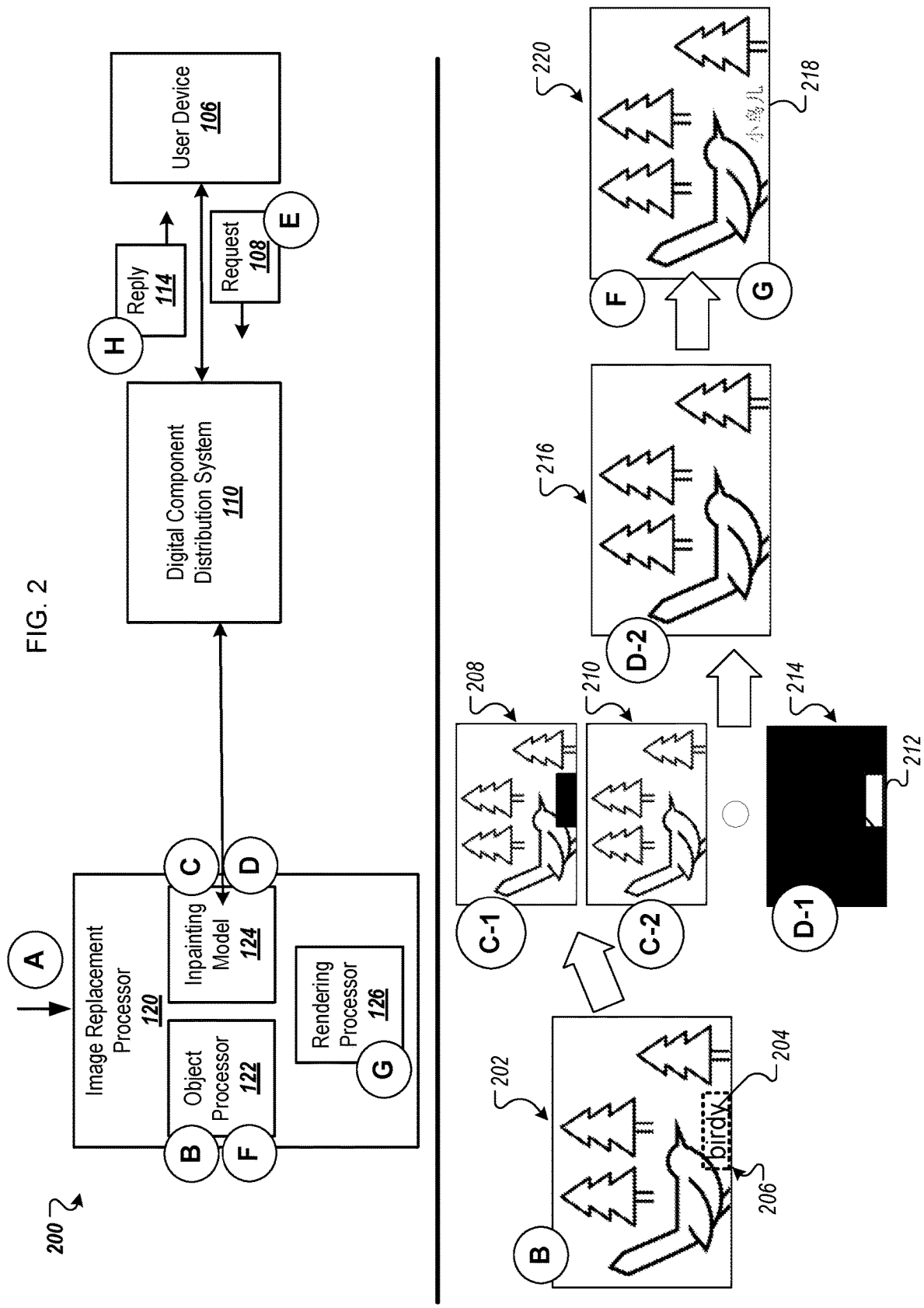
FIG. 2 depicts a data flow of an improved image replacement inpainting process.

FIG. 2 shows an example data flow 200 of an improved image replacement inpainting process in the example environment of FIG. 1. Operations of data flow 200 are performed by various components of the system 100. For example, operations of data flow 200 can be performed by image replacement processor 120 in communication with DCDS 110 and/or user device 106.

The flow begins with step A, in which image replacement processor 120 receives a final rendering 202. Final rendering 202 can be an image or a video. For example, image replacement processor 120 can receive a final image rendering 202 from a content provider, such as a third party 130, or from DCDS 110. In some implementations, image replacement processor 120 receives final rendering 202 from a user such as a user of a user device 106. In some implementations, image replacement processor 120 retrieves final rendering 202 from a storage medium such as a database. For example, image replacement processor 120 retrieves final rendering 202 from digital component database 112. In some implementations, image replacement processor 120 can receive instructions to retrieve final rendering 202.

The flow continues with step B, in which image replacement processor 120 detects a target object to be replaced and generates a bounding box 206 that surrounds the target object. For example, object processor 122 can detect target object 204 and its object type. In this particular example, target object 204 is a text label. In other implementations, the target object can be other types of content such as text, an open shape, a closed shape, a complex shape with transparency parameters, a simple shape, a moving shape, and/or a changing shape, among other types of objects.

Object processor 122 can also generate a bounding box 206 around the target object 204. In some implementations, the bounding box 206 is determined based on predetermined parameters. For example, the bounding box 206 can be determined to be a rectangular shape surrounding the target object having margins of at least a predetermined size between the bounding box 206 and the target object 204. For example, object processor 122 can determine a bounding box 206 around the target object 204 by detecting the edges of target object 204 and following a margin parameter. The margin parameter can be provided, for example, by a user of a user device 106, by a content provider, by the DCDS 110, and/or by a third party 130.

Object processor 122 also detects target object 204's position within final rendering 202. For example, object processor 122 can determine target object 204's position in terms of an x position and a y position. In some implementations, object processor 122 can determine target object 204's position relative to a reference point (e.g., a reference pixel location and an area occupied by the target object). In some implementations, object processor 122 can determine target object 204's absolute position.

The flow continues with step C, in which image replacement processor 120 recreates the content data of the area of final rendering 202 within the bounding box 206. First, in substep C-1, image replacement processor 120 generates a mask for the area of final rendering 202 within the bounding box 206 to remove the content of final rendering 202 within the bounding box 206. Image replacement processor 120 then applies the mask to final rendering 202 to generate a masked image 208 that does not include the content of final rendering 202 within the bounding box 206. In some implementations, object processor 122 generates and applies the mask to final rendering 202 to generate a masked image 208.

Next, in substep C-2, inpainting model 124 can recreate the content within the area surrounding the target object (e.g., the area within the bounding box 206) by uniformly sampling $r \in [r_{min}, r_{max}]$ where $r_{min}$ and $r_{max}$ are the minimum and maximum aspect ratios, respectively. Inpainting model 124 can then uniformly sample $h \in$ $$\left[\sqrt{\frac{a_{min}}{r}}, \min\left(\sqrt{\frac{a_{max}}{r}}, y_{max} - 2m, \frac{x_{max} - 2m}{r}\right)\right]$$

where $a_{min}$ and $a_{max}$ are the minimum and maximum coverage areas, respectively; $x_{max}$ and $y_{max}$ are the image width and height, respectively; and m is the desired margin around the edges of the target object. Inpainting model 124 can next set w=rh to conform with a selected aspect ratio. In some implementations, the selected aspect ratio is the aspect ratio of the original image. In other implementations, the aspect ratio can be selected based on user input or other parameters.

Inpainting model 124 can then uniformly sample $x_{corner} \in [m, x_{max}-(m+w)]$ and $y_{corner} \in [m, y_{max}-(m+h)]$.

Using this sampled data, inpainting model 124 can recreate content within the area of final rendering 202 inside of the bounding box 206 without the target object 204. Inpainting model 124 can perform, for example, structural or geometric inpainting, textural inpainting, and/or a combination of structural and textural inpainting. Because inpainting model 124 is able to adapt to images with structural properties ranging from complex, variable textures and boundaries to simple edges and structural properties. For example, inpainting model 124 can generate a second image 210 using the masked image that includes the content within the area of final rendering 202 recreated by inpainting model 124. In other words, the second image can be a recreation of the final rendering 202 generated by the inpainting model 124 using the masked image 208 as input.

In some implementations, second image 210 includes the content of final rendering 202 outside of the bounding box 206 exactly as represented in final rendering 202. For example, the content of final rendering 202 outside of the bounding box 206 can be used in second image 210 exactly as it is input, or can be reproduced by inpainting model 124 exactly as it was input to inpainting model 124. In some implementations, second image 210 includes content that represents the content of final rendering 202 outside of the bounding box 206 that is generated by inpainting model 124. For example, inpainting model 124 can generate the content of final rendering 202 outside of the bounding box 206, and this generated content may not represent the content of final rendering 202 exactly as it was input. The second image 210 can have the same dimensions as the final rendering 202. In some implementations, the second image 210 can have different dimensions from the final rendering 202. For example, the second image 210 can be a scaled version of the final rendering 202.

The flow continues with step D, in which image replacement processor 120 generates an "inverse" masked image. First, in substep D-1, image replacement processor 120 generates an "inverse" mask for the area of the second image 210 outside of the position of a bounding box 212. Image replacement processor 210 can generate the bounding box 212 at the same position and with the same proportions as the bounding box 206 in the final rendering 202. The bounding box 212 can contain the recreated content generated by inpainting processor 124. Inpainting model 124 can, for example, generate an inverse mask for the area of the second image 210 outside of the bounding box 212 to remove the area of the second image 210 outside of the bounding box 212. Inpainting model 124 then applies the inverse mask to the second image 210 to create an inverse masked image 214. In some implementations, object processor 122 generates and applies the mask to second image 210 to generate an inverse masked image 214.

In substep D-2, inpainting model 124 can then create a composite of the masked image 208 and the inverse masked image 210 to generate a third image that represents a version of final rendering 202 that does not include the target object 204. For example, inpainting model 124 can use alpha blending to combine the masked image 208 and the inverse masked image 210 into a third image 216 that does not include the target object 204. Other techniques for combining the masked image 208 and inversed masked image 210 can also be used to create the third image 216, which includes a portion of each of the masked image 208 and the inversed masked image 210.

The flow continues with step E, in which the DCDS 110 receives a request 108 for content from user device 106. Request 108 is transmitted by user device 106 to DCDS 110 when the client device interacts with digital content. For example, if a user of user device 106 clicks a link to download a shopping application, the link can cause user device 106 to transmit a request 108 to DCDS 110. The request 108 can include interaction tracking data from the client device 106. For example, the request 108 can include tracking data such as an indication of the interaction, the digital content with which user device 106 interacted, and an identifier that uniquely identifies user device 106. In some implementations, the request 108 includes an indication of the provider of the digital content and the location of the destination server that hosts the requested resource.

The DCDS 110 processes the request and forwards a request for a particular image or video, including customization information, to image replacement processor 120. For example, the DCDS 110 can select a particular video using the content selection process described above with respect to FIG. 1 and determine customization information to provide to image replacement processor 120. In some implementations, the DCDS 110 determines customization information based on of the context in which the image or video will be presented at a user device 106. In some implementations, the DCDS 110 determines customization information based on information from, for example, a third party 130 that provides content to the DCDS 110.

The flow continues with step F, in which image replacement processor 120 adds a replacement object to the third image 216, or the composite image. The replacement object 218 can be of the same type as the target object 204 or of a different type. For example, the replacement object 218 can be an image while the target object 204 is text. In some implementations, the replacement object 218 can be selected based on the customization information. In some implementations, the replacement object 218 is provided to the image replacement processor 120. Object processor 122 can add a replacement object 218 in the same position in which the target object 204 was located in final rendering 202. In some implementations, object processor 122 can add a replacement object 218 in a different position relative to the position in which the target object 204 was located in final rendering 202. In one particular example, object processor 122 can move the target object 204 to a different position in the third image 216 relative to the position in which the target object 204 was located in the final rendering 202.

The flow continues with step G, in which image replacement processor 120 re-renders the image with the added object to generate a new image. For example rendering processor 126 can create a composite of the third image 216 and the replacement object 218 into a new rendering 220. In some implementations, rendering processor 126 can use alpha blending techniques to create new rendering 220.

In some implementations, image replacement processor 120 can create new rendering 220 by creating a composite of the second image 210 and the replacement object 218. For example, image replacement processor 120 may not perform step D.

The flow continues with step H, in which image replacement processor 120 provides the new image or video to DCDS 110 for presentation to user device 106 along with, or as, reply 114. For example, image replacement processor 120 provides new rendering 220 to DCDS 110 for presentation to user device 106 along with reply 114. As described above, reply data 114 can indicate the image or video content as re-rendered by image replacement processor 120 in addition the requested electronic document. Reply data 114 is transmitted by DCDS 110 to user device 106 in response to DCDS 110 receiving request 108 and determining, based on the received distribution parameters and user data indicated in request 108, that the distribution parameters are satisfied.

Figure 3:
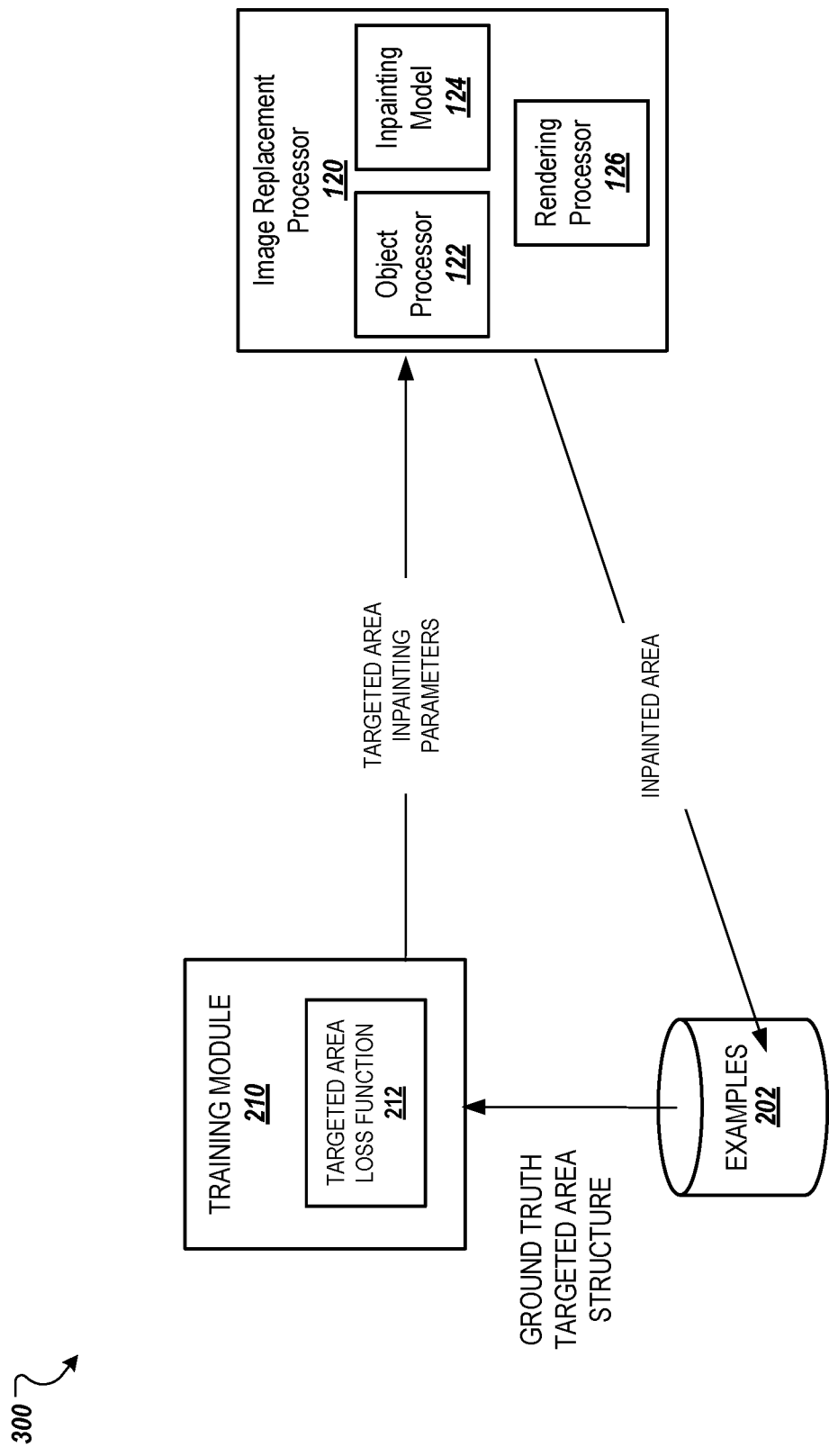
FIG. 3 is a diagram of an example machine learning process for training an image replacement inpainting model.

FIG. 3 is a diagram of an example block diagram of a system 300 for training an intelligent garment system. For example, system 300 can be used to train inpainting model 124 as described with respect to FIG. 1.

Examples 202 are provided to training module 210 as input to train, in this particular example, a GAN-based inpainting model. Examples 202 can be positive examples (i.e., examples of inpainted area masks that have a threshold accuracy level) or negative examples (i.e., examples of inpainted areas that have less than a threshold accuracy level). Examples 202 can include the ground truth areas, or an area determined to have a threshold accuracy level with respect to an actual, correct area from an original image.

The ground truth indicates the actual, correct area from an original image. For example, examples 202 can include training sets in which an actual area is removed from an original image and provided to training module 210. In some implementations, a ground truth area can be generated and provided to training module 210 as an example 202 by generating, using inpainting model 124, an inpainted area mask and confirming that inpainted area mask has a threshold level of accuracy with respect to the actual, correct area from the original image. In some implementations, a human can manually verify the accuracy of the inpainted area mask. The inpainted area mask can be automatically detected and labelled by pulling data from a data storage medium that contains verified inpainted area masks.

The ground truth future motion can be correlated with particular inputs of examples 202 such that the inputs are labelled with the ground truth. With ground truth labels, training module 210 can use examples 202 and the labels to verify model outputs of inpainting model 124 and continue to train the model to improve the accuracy with which the model generates inpainted area masks.

Training module 210 trains inpainting model 124 using a targeted area loss function 212. Training module 110 uses targeted area loss function 212 to train inpainting model 124 to generate an inpainted area mask. Targeted area loss function 212 can account for variables such as a predicted texture and/or a predicted structure, among other variables. For example, targeted area loss function 212 can focus on an area surrounding a target object, such the area within bounding box 206 surrounding target object 204 as depicted with respect to FIG. 2.

For example, inpainting model 124 can use a loss function, such as for example the one specified as follows:

$$G_{optimal} = \arg\min_{G}\max_{D} L(G, D)$$

$$L(G, D) = E_{x,y}[\log D(x, y)] + E_x[\log(1 - D(x, G(x)))] + \lambda E_{x,y}[\|y - G(x)\|_1]$$

This loss function represents a difference between a target area of the first image and content of the second image at a location corresponding to the target area of the first image. Because the content outside the masked area is highly reproducible, and in some implementations can be copied exactly, leading to very low differences between those portions of the original image and the newly generated image, the system's loss function focuses on the portion of the newly generated image corresponding to the masked area instead of allowing the area outside the masked area to dominate the loss function.

Training module 210 can train inpainting model 124 manually or the process could be automated. Training module 210 uses the loss function 212 and examples 202 labelled with the ground truth areas to train inpainting model 124 to learn what is important for the model. For example, training module 210 can train inpainting model 124 by optimizing the model based on the loss function. In some implementations, optimizing the model based on the loss function includes minimizing the result of the loss function, which minimizes a difference between the target area of training images and content of generated images at a location corresponding to the target area of the training images. In some implementations, training module 210 can use a threshold value for the difference, such as a maximum percentage difference. For example, training module 210 can train inpainting model 124 to reconstruct content at a location corresponding to a target area in a training image with a maximum of 5%, 10%, or 20% difference, among other percentages. In some implementations, training module 210 can train inpainting model 124 to reconstruct content at a location corresponding to a target area in a training image with a threshold number of pixels, such as a maximum number of different pixels or a minimum number of similar, or identical pixels. Training module 210 allows inpainting model 124 to learn by changing the weights applied to different variables to emphasize or deemphasize the importance of the variable within the model. By changing the weights applied to variables within the model, training module 210 allows the model to learn which types of information (e.g., which textures, structural components, boundaries, etc.) should be more heavily weighted to produce a more accurate inpainting model.

The examples and variables can be weighted based on, for example, feedback from image replacement processor 120. For example, if image replacement processor 120 collects feedback data that indicates that the loss function 212 is producing results that do not have a threshold level of accuracy with respect to a particular type of target object, then inpainting model 124 can weigh particular configurations more heavily than other configurations. The inpainted areas generated by inpainting model 124 that satisfy a threshold level of accuracy can be stored as positive examples 202.

Inpainting model 124 can use various types of models, including general models that can be used for all types of target objects and properties of original image, or final rendering 202, and customized models that can be used for particular subsets of target objects or original images sharing a set of characteristics, and can dynamically adjust the models based on the detected type of target object or original image. For example, the classifier can use a base GAN for all target objects and then tailor the model to each object.

Inpainting model 124 can adapt to and generate masks for a vast number of types of target objects. In some implementations, the training process for inpainting model 124 is a closed loop system that receives feedback information and dynamically updates the inpainting model network based on this feedback information.

Figure 4:
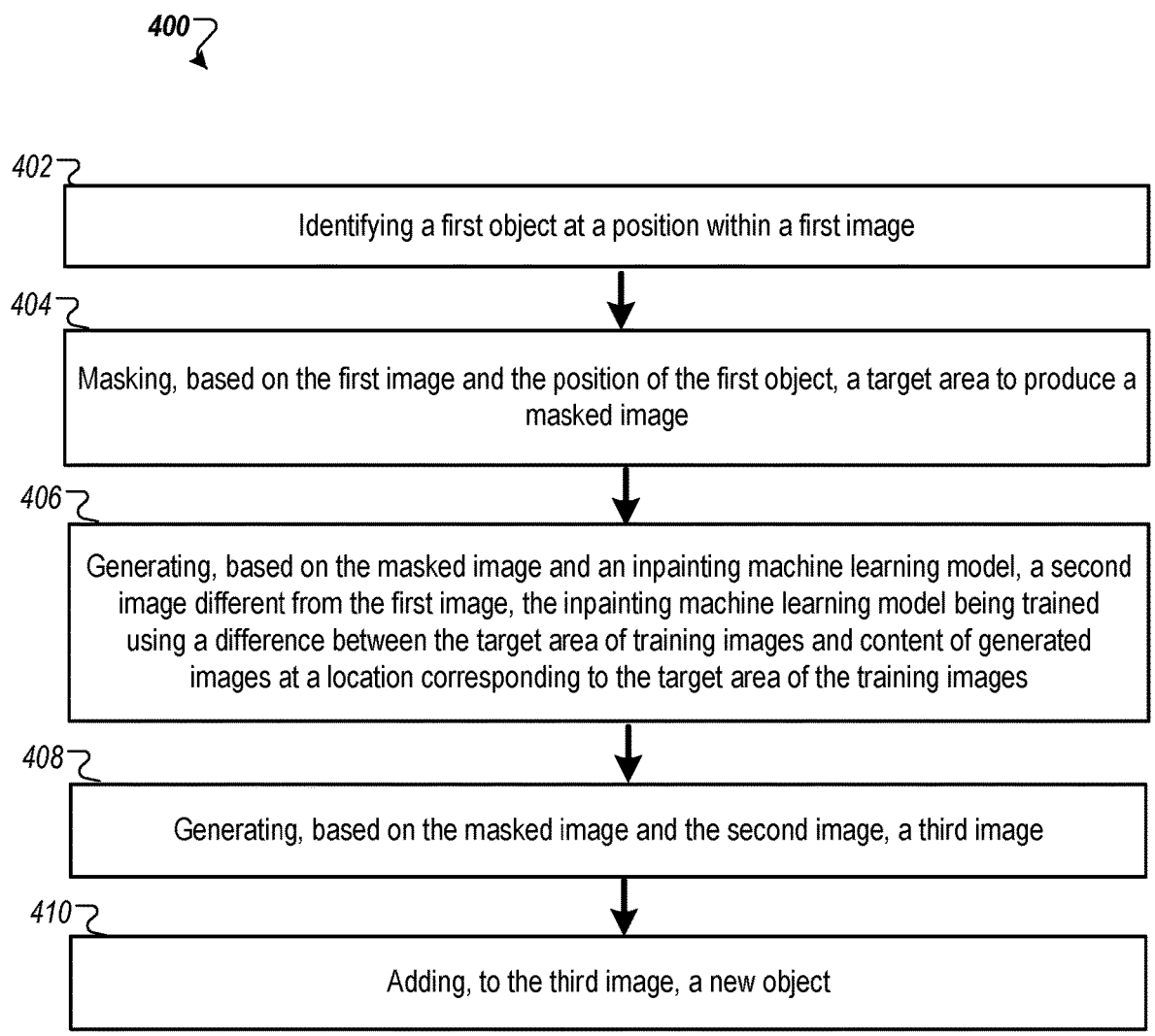
FIG. 4 is a flow chart of an example process for improved image replacement inpainting.

FIG. 4 is a flow chart of an example process 400 for process for improved image replacement inpainting. In some implementations, process 400 can be performed by one or more systems. For example, process 400 can be implemented by image replacement processor 120, DCDS 110, user device 106, and third party 140 of FIGS. 1-3. In some implementations, the process 400 can be implemented as instructions stored on a non-transitory computer readable medium, and when the instructions are executed by one or more servers, the instructions can cause the one or more servers to perform operations of the process 400.

The process 400 for replacing an object in an image begins with identifying a first object at a position within a first image (402). For example, image replacement processor 120 receives a final rendering 202 and identifies a target object 204 at a particular position within the first image. Object processor 122 of image replacement processor 120 can perform the identification. Object processor 122 can also identify an object type of target object 204 and determine a position of target object 204 in final rendering 202. Object processor 122 can generate a bounding box 206 surrounding target object 204.

The process 400 continues with masking, based on the first image and the position of the first object, a target area to produce a masked image (404). For example, image replacement processor 120 can generate a mask to remove the area within bounding box 206 based on final rendering 202. Object processor 122 or inpainting model 124 can perform the mask generation and application process as described above with respect to FIGS. 1-3.

The process 400 continues with generating, based on the masked image and an inpainting machine learning model, a second image different from the first image, the inpainting machine learning model being trained using a loss function that represents a difference between the target area of training images and content of generated images at a location corresponding to the target area of the training images (406). For example, inpainting model 124 can generate a second image 210 based on final rendering 202 as described above with respect to FIGS. 1-3. As described above, inpainting model 124 is trained to focus on areas that are a subset of an entire image and surrounding target objects of particular types.

The process 400 continues with generating, based on the masked image and the second image, a third image (408). For example, image processor 120 can generate an inverse masked image based on the second image and an inverse mask as described above with respect to FIGS. 1-3. Image processor 120 can then generate a third image by compositing the masked area and the inverse mask. For example, inpainting model 124 or object processor 122 can generate third image 216.

The process 400 continues with adding, to the third image, a new object (410). For example, image processor 120 can generate a new rendering 220 by adding a replacement object 218 that is different from target object 206 to third image 216. Rendering processor 126 can use, for example, alpha blending techniques to create new rendering 222. In some implementations, image processor 120 adds replacement object 218 to third image 216 at the relative position of the target object 206 within the final rendering 202. In some implementations, image processor 120 adds replacement object 218 to third image 216 at a different position. In some implementations, replacement object 218 is the same object as the target object 206 and the process 400 relocates the target object 206 with respect to its position within final rendering 202.

Figure 5:
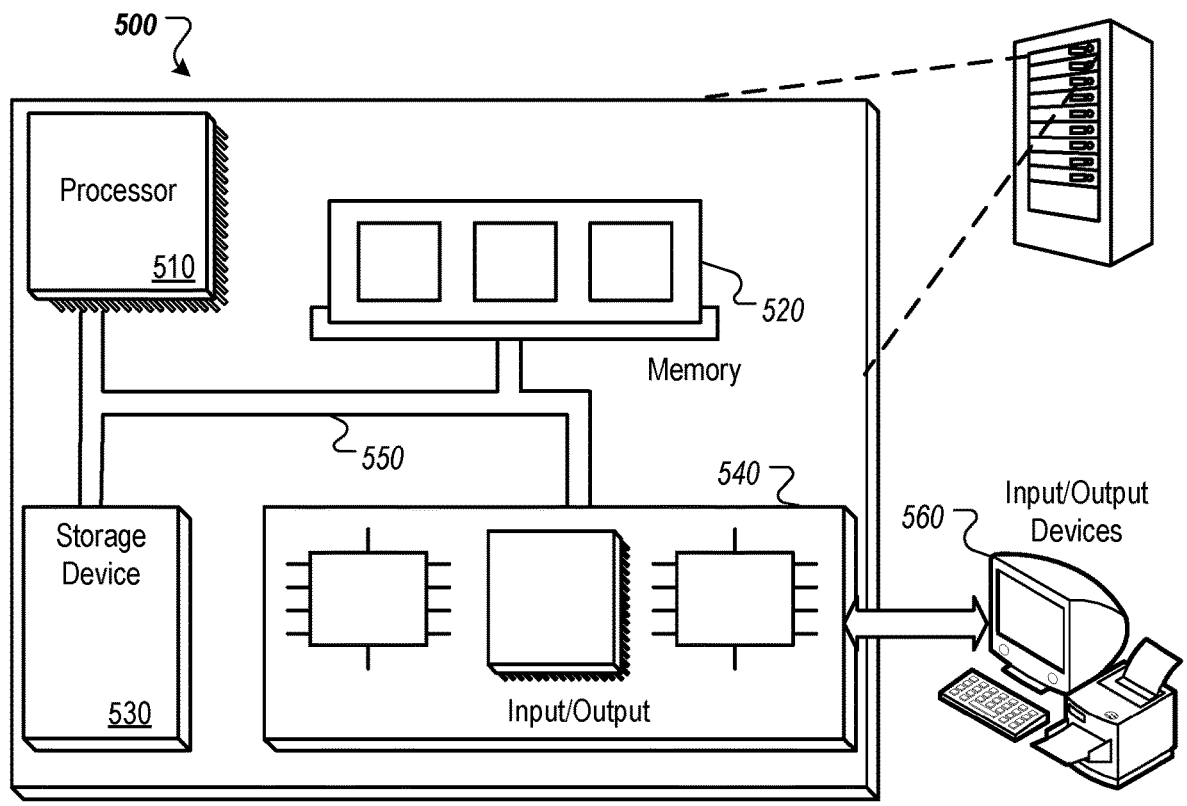
FIG. 5 is a block diagram of an example computing system.

FIG. 5 is block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including, by way of example, a programmable processor, a computer, a system on a chip, or multiple ones, or combinations, of the foregoing. The apparatus can include special-purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special-purpose logic circuitry, e.g., an FPGA (field-programmable gate array) or an ASIC (application-specific integrated circuit).

Processors suitable for the execution of a computer program include, by way of example, both general and special-purpose microprocessors. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD ROM and DVD-ROM disks. The processor and the memory can be supplemented by, or incorporated in, special-purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for replacing an object in an image comprising:
    identifying a first object at a position within a first image;
    masking, based on the first image and the position of the first object, a target area to produce a masked image;
    generating, based on the masked image and an inpainting machine learning model, a second image different from the first image, the inpainting machine learning model being trained using a difference between the target area of training images and content of generated images at a location corresponding to the target area of the training images;
    generating, based on the masked image and the second image, a third image, wherein generating the third image comprises:
        masking, based on the second image and the location corresponding to the target area of the first image, an inverse target area to produce an inverse masked image; and
        generating, based on the masked image and the inverse masked image, the third image; and
    adding, to the third image, a new object different from the first object.

2. The computer-implemented method of claim 1, wherein the first image is a frame of a video.

3. The computer-implemented method of claim 1, wherein the inpainting machine learning model is trained using a loss function that represents a difference between the target area of training images and content of generated images at a location corresponding to the target area of the training images.

4. The computer-implemented method of claim 1, wherein the inverse target area comprises an area of the second image that is outside of the location corresponding to the target area of the first image.

5. The computer-implemented method of claim 1, wherein masking, based on the second image and the location corresponding to the target area of the first image, an inverse target area to produce an inverse masked image comprises generating, from the second image, an inverse masked image that includes at least some content of the second image that is inside the target area and that does not include at least some content of the second image that is outside the target area.

6. The computer-implemented method of claim 1, wherein generating the third image comprises compositing the inverse masked image with the masked image.

7. The computer-implemented method of claim 1, further comprising extrapolating, based on the third image, a fourth image, wherein each of the first image, second image, third image, and fourth image is a frame of a video.

8. A system comprising:
one or more processors; and
one or more memory elements including instructions that, when executed, cause the one or more processors to perform operations including:
identifying a first object at a position within a first image;
masking, based on the first image and the position of the first object, a target area to produce a masked image;
generating, based on the masked image and an inpainting machine learning model, a second image different from the first image, the inpainting machine learning model being trained using a difference between the target area of training images and content of generated images at a location corresponding to the target area of the training images;
generating, based on the masked image and the second image, a third image, wherein generating the third image comprises:
masking, based on the second image and the location corresponding to the target area of the first image, an inverse target area to produce an inverse masked image; and
generating, based on the masked image and the inverse masked image, the third image; and
adding, to the third image, a new object different from the first object.

9. The system of claim 8, wherein the inpainting machine learning model is trained using a loss function that represents a difference between the target area of training images and content of generated images at a location corresponding to the target area of the training images.

10. The system of claim 8, wherein the first image is a frame of a video.

11. The system of claim 8, wherein the inverse target area comprises an area of the second image that is outside of the location corresponding to the target area of the first image.

12. The system of claim 8, wherein masking, based on the second image and the location corresponding to the target area of the first image, an inverse target area to produce an inverse masked image comprises generating, from the second image, an inverse masked image that includes at least some content of the second image that is inside the target area and that does not include at least some content of the second image that is outside the target area.

13. The system of claim 8, wherein generating the third image comprises compositing the inverse masked image with the masked image.

14. The system of claim 8, the operations further comprising extrapolating, based on the third image, a fourth image, wherein each of the first image, second image, third image, and fourth image is a frame of a video.

15. A non-transitory computer storage medium encoded with instructions that when executed by a distributed computing system cause the distributed computing system to perform operations comprising:
identifying a first object at a position within a first image;
masking, based on the first image and the position of the first object, a target area to produce a masked image;
generating, based on the masked image and an inpainting machine learning model, a second image different from the first image, the inpainting machine learning model being trained using a difference between the target area of training images and content of generated images at a location corresponding to the target area of the training images;
generating, based on the masked image and the second image, a third image, wherein generating the third image comprises:
masking, based on the second image and the location corresponding to the target area of the first image, an inverse target area to produce an inverse masked image; and
generating, based on the masked image and the inverse masked image, the third image; and
adding, to the third image, a new object different from the first object.

16. The non-transitory computer storage medium of claim 15, wherein the inpainting machine learning model is trained using a loss function that represents a difference between the target area of training images and content of generated images at a location corresponding to the target area of the training images.

17. The non-transitory computer storage medium of claim 15, wherein the first image is a frame of a video.

* * * * *